(12) United States Patent
Page (10) Patent No.: US 9,671,876 B2
(45) Date of Patent: *Jun. 6, 2017

(54) PERSPECTIVE TRACKING SYSTEM (71) Applicant: Raydon Corporation, Port Orange, FL (US)

(72) Inventor: David Page, Cocoa, FL (US)

(73) Assignee: RAYDON CORPORATION, Port Orange, FL (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/707,672

(22) Filed: May 8, 2015

(65) Prior Publication Data

US 2015/0355730 A1 Dec. 10, 2015

Related U.S. Application Data

(63) Continuation of application No. 11/641,123, filed on Dec. 19, 2006, now Pat. No. 9,052,161.

(Continued)

(51) Int. Cl.
*F41A 33/00* (2006.01)
*F41G 3/26* (2006.01)

(Continued)

(52) U.S. Cl.
CPC ............ *G06F 3/0346* (2013.01); *F41A 33/00* (2013.01); *F41G 3/26* (2013.01); *F41G 3/2605* (2013.01);

(Continued)

(58) Field of Classification Search
CPC .. F41A 33/00; F41A 33/02; F41G 3/26; F41G 3/2605; F41G 3/2627;

(Continued)

(56) References Cited

U.S. PATENT DOCUMENTS 3,996,590 A * 12/1976 Hammack ............... G01S 1/302
342/107
4,409,899 A * 10/1983 Owen ..................... G01S 11/16
102/211

(Continued)

*Primary Examiner* — Nikolai A Gishnock
(74) *Attorney, Agent, or Firm* — Miles and Stockbridge P.C.

(57) ABSTRACT

Resolution of perspective in three dimensions is necessary for intermeshing real players into simulated environments during virtual training exercises. With the advent of high resolution image sensors the ability to sense position and orientation using image capture devices is possible. The combination of small sized sensors and image recognition tracking algorithms allows the tracking element to be placed directly on the device whose perspective is desired. This provides a solution to determining perspective as it provides a direct measurement from the center axis of the observer. This invention employs a perspective tracking device to determine a point-of-gaze or a point-of-aim in a three-dimensional space to a high degree of accuracy. Point-of-gaze may be used to determine views for head mounted displays and aim-points for weapons. The invention may operate in an unconstrained space allowing simulation participants to operate in a larger, open environment. Areas of interest in the environment are bounded by area of interest markers which identify the region and its physical constraints.

11 Claims, 6 Drawing Sheets

Related U.S. Application Data (60) Provisional application No. 60/751,298, filed on Dec. 19, 2005.

(51) Int. Cl.

| | | |
|---|---|---|
| *F41J 9/00* | (2006.01) | |
| *F41J 5/02* | (2006.01) | |
| *G06K 9/78* | (2006.01) | |
| *G09B 9/00* | (2006.01) | |
| *G09B 19/00* | (2006.01) | |
| *G06F 3/0346* | (2013.01) | |
| *F41J 9/08* | (2006.01) | |
| *G01B 11/14* | (2006.01) | |
| *G09B 9/08* | (2006.01) | |
| *G09B 9/04* | (2006.01) | |
| *G09B 9/30* | (2006.01) | |
| *G06T 7/80* | (2017.01) | |
| *G01B 21/04* | (2006.01) | |
| *G06T 7/73* | (2017.01) | |
| *G06K 9/32* | (2006.01) | |
| *G01S 5/16* | (2006.01) | |
| *G06F 17/30* | (2006.01) | |

(52) U.S. Cl.
CPC . *F41J 5/02* (2013.01); *F41J 9/00* (2013.01); *F41J 9/08* (2013.01); *G01B 11/14* (2013.01); *G01B 21/042* (2013.01); *G01S 5/163* (2013.01); *G06K 9/3216* (2013.01); *G06K 9/78* (2013.01); *G06T 7/74* (2017.01); *G06T 7/80* (2017.01); *G09B 9/00* (2013.01); *G09B 9/003* (2013.01); *G09B 9/006* (2013.01); *G09B 9/04* (2013.01); *G09B 9/08* (2013.01); *G09B 9/301* (2013.01); *G09B 9/307* (2013.01); *G09B 19/00* (2013.01); *F41G 3/2661* (2013.01); *G06F 17/30825* (2013.01); *G06F 17/30831* (2013.01); *G06T 2207/10016* (2013.01); *G06T 2207/30204* (2013.01)

(58) Field of Classification Search
CPC ...... F41G 3/2633; F41G 3/265; F41G 3/2655; F41G 3/2661; F41G 3/323; F41J 1/10; F41J 2/02; F41J 5/02; F41J 5/08; F41J 5/10; F41J 9/00; G02B 23/12; G02B 27/46; G06F 3/0325; G06F 3/0346; G06F 3/0383; G06F 3/0386; G06F 3/042; G06K 9/3216; G06K 9/78; G06T 7/0018; G06T 7/0044; G06T 7/2033; G06T 15/20; G06T 19/00; G06T 2207/10016; G06T 2207/30204; G09B 9/00; G09B 9/003; G09B 9/006; G09B 9/301; G09B 9/307
USPC ............... 434/11, 16, 19, 21; 250/330, 340; 340/425.5, 500, 945, 988
See application file for complete search history.

(56) References Cited

U.S. PATENT DOCUMENTS

| | | | | |
|---|---|---|---|---|
| 5,215,464 A * | 6/1993 | Marshall | ............... | F41G 3/2655 250/208.1 |
| 5,260,557 A * | 11/1993 | Kissh | ................... | G01S 3/7867 250/203.6 |
| 5,816,817 A * | 10/1998 | Tsang | ..................... | F41G 3/265 348/121 |
| 5,835,077 A * | 11/1998 | Dao | ......................... | G01C 9/00 345/157 |
| 5,874,938 A * | 2/1999 | Marten | ..................... | G06F 3/0383 341/144 |
| 5,889,505 A * | 3/1999 | Toyama | ................ | G06F 3/0325 345/156 |
| 5,988,645 A * | 11/1999 | Downing | ................... | F41J 5/02 250/222.2 |
| 6,473,980 B2 * | 11/2002 | Ripingill, Jr. | .............. | F41J 5/02 33/275 R |
| 6,604,064 B1 * | 8/2003 | Wolff | ..................... | G09B 19/00 434/21 |
| 7,202,776 B2 * | 4/2007 | Breed | ..................... | B60N 2/2863 340/435 |
| 7,239,301 B2 * | 7/2007 | Liberty | ................. | G06F 1/3215 345/156 |
| 7,329,127 B2 * | 2/2008 | Kendir | .................. | F41G 3/2655 434/16 |
| 7,345,265 B2 * | 3/2008 | Page | ..................... | F41G 3/2633 244/3.1 |
| 7,413,514 B2 * | 8/2008 | Saikawa | ............... | A63F 13/005 434/16 |
| 7,488,176 B2 * | 2/2009 | Erdoss | ........................ | F41J 9/18 124/34 |
| 7,598,854 B2 * | 10/2009 | Wong | .................... | G01S 5/0284 340/10.1 |
| 7,677,893 B2 * | 3/2010 | Lvovskiy | ................ | F41A 33/02 42/41 |
| 8,303,405 B2 * | 11/2012 | Zalewski | ................ | G06F 3/017 273/148 B |
| 8,632,338 B2 * | 1/2014 | Miasnik | .................. | F41A 33/02 434/21 |
| 8,777,619 B2 * | 7/2014 | Schubert | ................. | F41A 33/00 434/11 |
| 8,860,818 B1 * | 10/2014 | Sachs | ................. | H04N 5/23216 348/180 |
| 8,864,496 B2 * | 10/2014 | Moran | .................... | F41A 33/00 434/11 |
| 8,920,172 B1 * | 12/2014 | Wilmink | .................... | F41G 3/26 434/19 |
| 9,013,597 B2 * | 4/2015 | Okubo | .................. | H04N 5/2355 348/229.1 |
| 9,052,161 B2 * | 6/2015 | Page | ...................... | F41G 3/2605 |
| 9,082,168 B2 * | 7/2015 | Hiroike | .................. | G06T 7/0012 |
| 9,092,853 B2 * | 7/2015 | Sachs | ................. | H04N 5/23216 |
| 9,293,058 B2 * | 3/2016 | Schubert | ................... | F41A 33/00 |
| 9,330,576 B2 * | 5/2016 | Moran | ..................... | G09B 9/003 |
| 9,330,577 B2 * | 5/2016 | Klein | ..................... | G09B 19/00 |
| 9,466,120 B2 * | 10/2016 | Maryfield | ............... | G06T 7/246 |
| 9,524,580 B2 * | 12/2016 | Katz | ..................... | G02B 27/017 |
| 2002/0023478 A1 * | 2/2002 | Pryor | ...................... | G01C 11/02 73/1.01 |
| 2003/0095186 A1 * | 5/2003 | Aman | ................ | A63B 24/0021 348/162 |
| 2004/0155186 A1 * | 8/2004 | Nestorovic | ............ | G02B 23/12 250/330 |
| 2006/0244907 A1 * | 11/2006 | Simmons | .................. | G02C 7/16 351/159.26 |
| 2007/0152157 A1 * | 7/2007 | Page | ..................... | G06T 7/0044 250/340 |
| 2007/0238073 A1 * | 10/2007 | Portoghese | ........... | F41G 3/2605 434/21 |
| 2008/0108021 A1 * | 5/2008 | Slayton | .................... | A63F 13/04 434/16 |
| 2008/0239136 A1 * | 10/2008 | Kanai | ..................... | H04N 5/217 348/340 |
| 2008/0306708 A1 * | 12/2008 | Germain, IV | ........ | G01B 21/042 702/153 |
| 2009/0046056 A1 * | 2/2009 | Rosenberg | .............. | G06F 3/011 345/156 |
| 2009/0267895 A1 * | 10/2009 | Bunch | .................. | G06F 3/0386 345/157 |
| 2010/0097209 A1 * | 4/2010 | Wong | ..................... | G01S 5/0284 340/539.13 |
| 2010/0227297 A1 * | 9/2010 | Harvey, Jr. | ............ | G09B 9/301 434/11 |
| 2010/0245608 A1 * | 9/2010 | Trudeau | .................. | G06T 5/009 348/222.1 |
| 2015/0215607 A1 * | 7/2015 | Chou | ................. | H04N 13/0246 348/49 |

(56) References Cited

U.S. PATENT DOCUMENTS

| | | | |
|---|---|---|---|
| 2015/0215615 A1* | 7/2015 | Chou | H04N 13/0246 348/187 |
| 2016/0209183 A1* | 7/2016 | Bakken | G01P 3/685 |
| 2016/0265880 A1* | 9/2016 | Maryfield | G06T 7/246 |
| 2017/0010070 A1* | 1/2017 | Maryfield | G06T 7/246 |

* cited by examiner

PERSPECTIVE TRACKING SYSTEM

The present application is a continuation of U.S. patent application Ser. No. 11/641,123, filed Dec. 19, 2006, which claims the benefit of U.S. Provisional Application 60/751,298, filed on Dec. 19, 2005, each of which is incorporated herein by reference in its entirety.

BACKGROUND OF THE INVENTION

Field of the Invention

This invention relates to perspective tracking.

Background Art

With the advancements in simulated environment, virtual training has become a possibility. Virtual participation in these simulated environments cannot fully replicate real participation correctly, due to the lack of free motion in virtual participation solutions. Real participation introduces the problem of tracking the movement and perspective of the real participants in the simulated environment. What is needed is a solution for determining perspective of the real participant in the simulated environment.

BRIEF SUMMARY OF THE INVENTION

The use of video tracking to derive motion in two dimensions is well established for easily distinguishable targets in a video field. This invention builds on the tracking of point light emitters to locate regions of interest in a field of view where high accuracy of aim-point and positional information are both needed. A single perspective tracking device (PTD) captures a continuous image stream of its current field of view. As point light emitters enter the field of view, a track is built up for each, and the identity of each emitter is derived from the detected modulation patterns of each. These emitter identities are used to identify an area of interest and to determine the perspective of the PTD. Successive images and tracks are used to build up motion formulae for six degrees of freedom (6 DOF) in real time. This system may be used for determining a point-of-gaze for head-mounted displays (HMDs), point-of-aim for simulated weapons, and may be used for robotic control in open spaces.

The PTD represents one of two components that work in unison to provide high accuracy orientation/perspective measurements. In some implementations, the PTD is a high resolution infrared (IR) video tracker which is used to detect infrared point light emitters and accurately identify their angular relationship from the center of the field of view. The second component is an area of interest marker (AIM). In some embodiments of the invention, an AIM would include a single microprocessor with multiple infrared point light emitters attached. These AIMs serve as reference points as to position and perspective. A set of AIMs (one or more) may delineate an area of interest (AOI). Such a set of AIMs is treated as a group, or a single track point array (TPA), for certain processing operations to be described below. In some embodiments of the invention, only some of the emitters are attached to AIMs. In such embodiments, some of the emitters in the system exist apart from any AIM.

The PTD may include an infrared-sensitive image capture device coupled to a processing array that detects points in the field of view that match the criteria for AIM emitters. For each AIM emitter the processing array of the PTD detects a match for the AIM emitter and uses the pixel values which compose the image to compute a center of light for that emitter. The center of light is analogous to a center of mass for a physical object, but represents a single averaged location for the emitted light energy. This center of light calculation is performed for each emitter in the captured frame, yielding a mathematical centroid. The PTD translates each centroid into an angular measurement offset in the horizontal ($\alpha$) and vertical ($\beta$) axis. These angles are corrected based on tables stored in the PTD to compensate for spherical asymmetries inherent in the lens systems used in digital imaging systems. The corrected offsets are denoted as $\alpha'$ and $\beta'$ respectively. Standard tracking sorting algorithms are utilized to re-identify each AIM emitter on successive frames of video and generate a history table for each emitter, or point. These histories are utilized to generate an angular path formula for each point on an on-going basis. Once a point path is determined (i.e., track lock is obtained), the location and path of an emitter is extrapolated (persisted or coasted) on frames when the corresponding AIM emitter may not be located. Lists of points, along with motion formula coefficients, are used in the PTD, thereby determining AIM identity and orientation. The identity of the AIM is used to look up physical characteristics (such as the size and shape of a surface marked by the AIM), which are then used to compute distance of the observer to the AIM field as well as exact angles. For example, a minimum of three point sources (AIMs) are needed to describe a two dimensional surface. For a rectangular surface that is three feet by four feet, we only need to know that the shape is a rectangle and the physical coordinates of the three AIMs to derive the fourth corner and, therefore, an aim-point within the enclosed area. When the separation of these points in video space is considered, and the rectangle is fitted to them, distance and incident angle can be determined.

In some embodiments of the invention, the computed perspective is returned on a frame by frame basis to a visuals control system that uses the perspective to update a user's view through the AIMs. This updated data is conveyed to users via either a tethered hardwire system or a wireless communication system.

DETAILED DESCRIPTION OF THE INVENTION

Embodiments of the present invention are now described with reference to the figures. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications other than those disclosed here.

Figure 1:
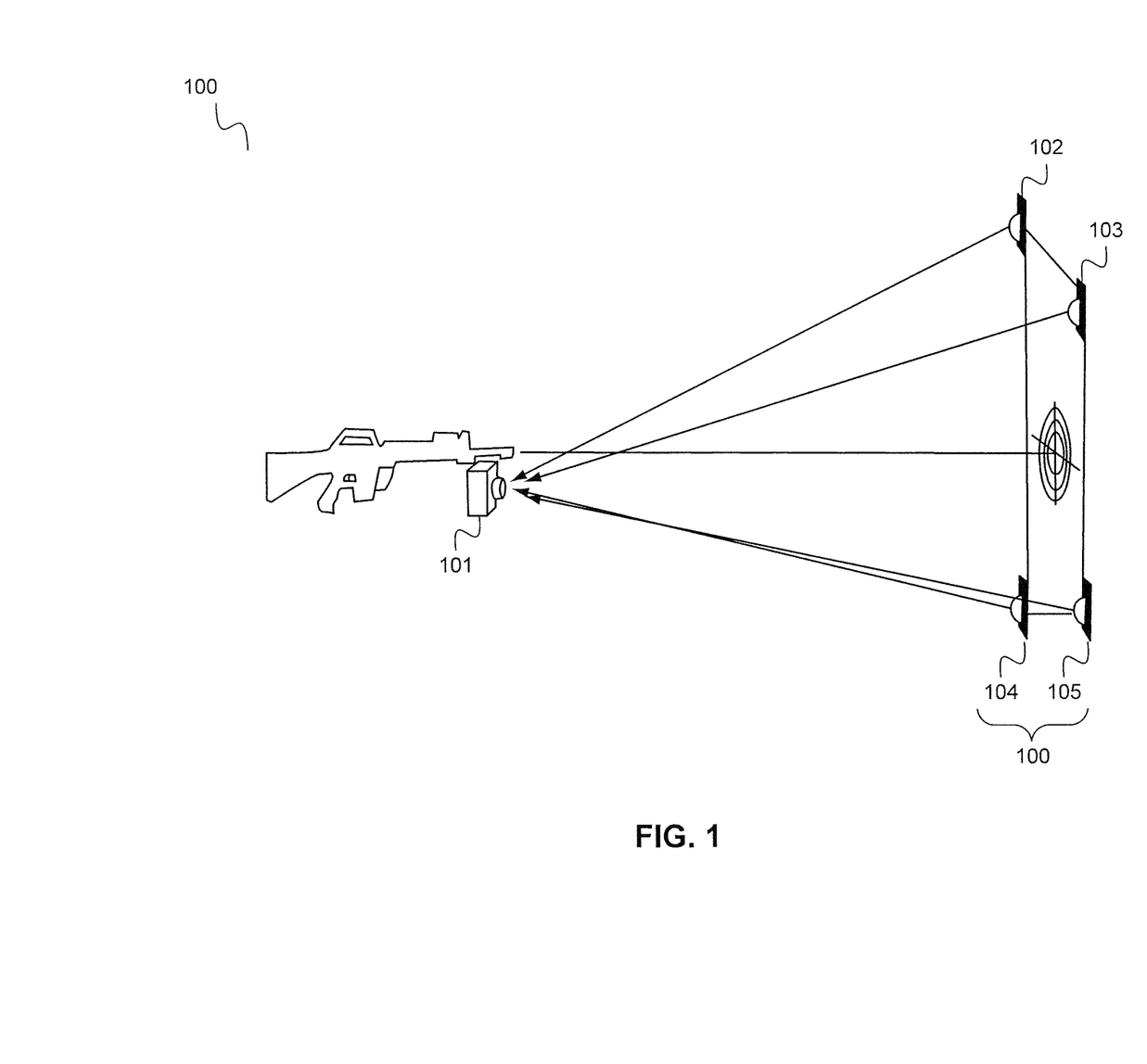
FIG. 1 illustrates a track point array that is detected and tracked by a perspective tracking device, according to an embodiment of the invention.

An embodiment of the invention is based on the detection of an array of emitters on a fixed plane in space. In FIG. 1 we see a depiction of the basic arrangement which may be repeated multiple times in, for example, a training environment. The array of emitters (102-105) define a single AOI (106), and are detected using a PTD (101).

Figure 2:
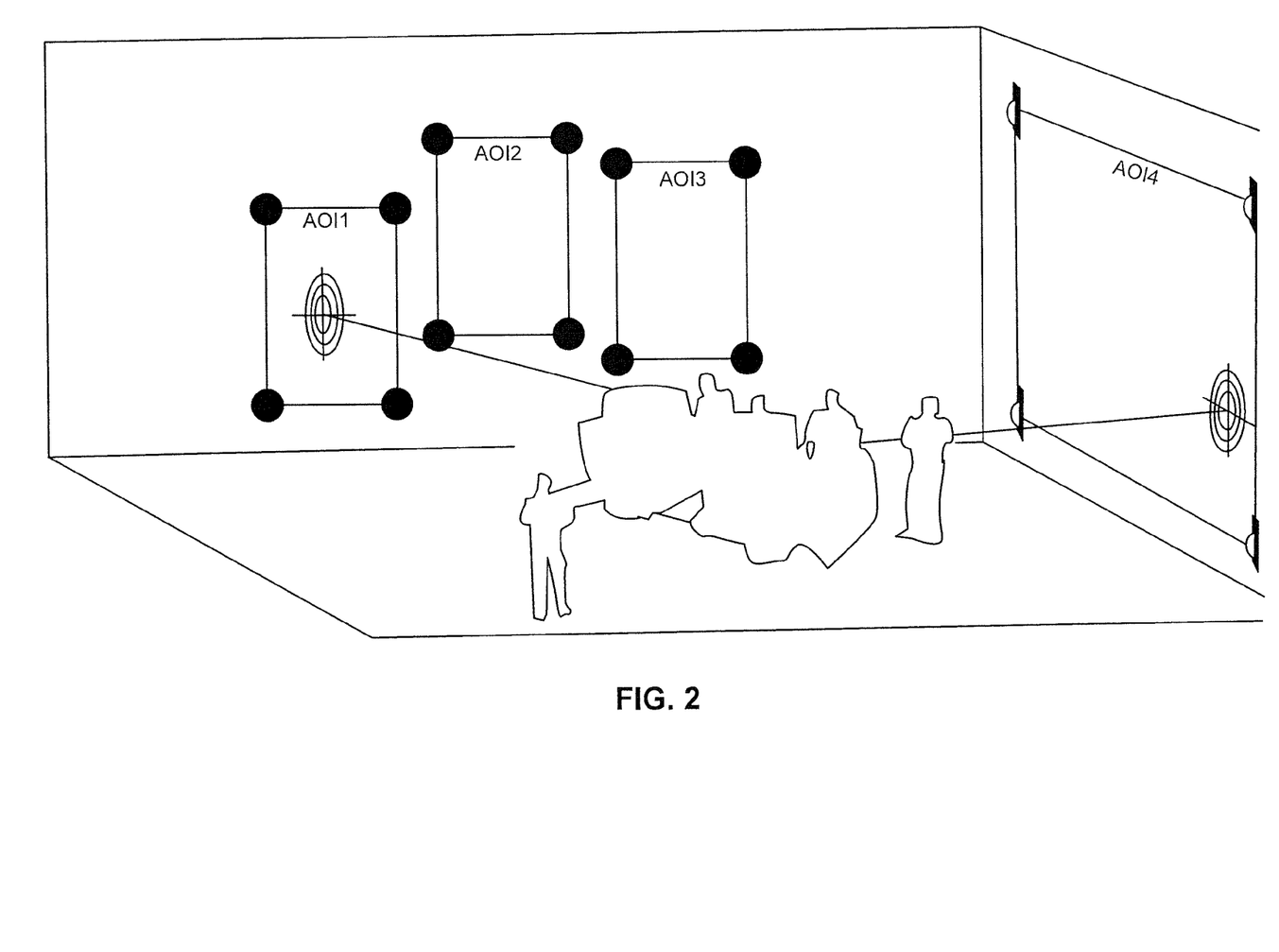
FIG. 2 illustrates a virtual training environment that includes walls having areas of interest, where the areas of interest are defined by area of interest markers, according to an embodiment of the invention.

In FIG. 2 we see a depiction of a virtual training environment with the augmentation of the environment with AIMs on the surrounding walls, where the AIMs define areas of interest AOI1 through AOI4. The PTDs can be mounted on HMDs, weapons, scopes, and/or binoculars. This allows for the generation of perspective-based imagery for trainees using such devices.

PTD devices may be enhanced using accelerometers, gyroscopes and magnetometers to detect orientation. PTDs enhanced in this manner would calibrate these devices during times of image-based track lock, then use them to extrapolate orientation and position when track lock is not possible. Various weighted methods to combine the diverse orientation information may be employed to improve accuracy (such as combining accelerometer and gyroscope information to yield motion and orientation in 6 DOF).

AOIs are delineated using infrared point light emitters that identify points on the AOI (e.g., corners) as well as the spatial position, orientation and size of the AOI. AOIs may overlap in physical space either on parallel planes or orthogonal planes. AOIs exist to provide precise locations in the field of view, areas of projected blue-screen imagery, or high accuracy aim-point data areas. More than one emitter may be used to delimit an AOI point. This allows the determination of an AOI's orientation, even though its corners or sides may be occluded.

In a three dimensional environment, AOIs are defined where high accuracy tracking of perspective is required. These AOIs may be two-dimensional polygonal regions where each vertex is marked by an emitter. Emitters may be infrared LEDs which are visible to tracking imaging systems. Each emitter source identifies a point in three dimensions in a bounded volume. A PTD detects emitters within its field of view and uses the relationships of the emitters to determine a current perspective in three dimensions.

The PTD's processor identifies each emitter and determines its physical spatial relationship to other emitters based on the emitter's unique identification coding. In some embodiments of the invention, each TPA emitter uniquely identifies itself to the system by modulating its light output isochronously to the system image capture frame rate. Within a given TPA emitter array modulation may be sent synchronously (i.e., all emitters at once), although each emitter's message may be unique. The emitter identification coding can be modulated at or near the video frame rate, allowing the PTD processor to detect the emitter's coding pattern. The identification coding may include error correction and validation sequences. The emitters of a TPA may be synchronized to the PTD using wireless communication. A TPA's IR emissions may be shortened and sent only during the peak sensitivity of the PTD sensor. Modulation of an emitter would then consist of dropping pulses during this period on a low-duty cycle basis.

The PTD computes a solution for perspective based on each emitter's location in the captured image field. Equations of motion are generated to allow the PTD to compute perspective during times of emitter occlusion. The PTD may use a secondary system to synchronize to an AOI's TPA. For example, a wireless connection may be used to signal the start of a point source modulation so that it may be synchronous with the video capture and allow for point source identity to be demodulated.

Three or more emitters can be used to define a two-dimensional surface having a polygonal outline. An n-sided polygon is defined using n or more emitters. Over-specification of the TPA outline can be used to improve accuracy and to compensate for occlusion of corner emitters.

A TPA may be implemented using an IR emitter and a micro-processor, or using an IR emitter and a programmed logic array. A TPA may also be implemented using an IR emitter and a memory cell used to replay the source IR through the emitter. A TPA may be permanently integrated into a device for use in an arena tracking environment.

Figure 3:
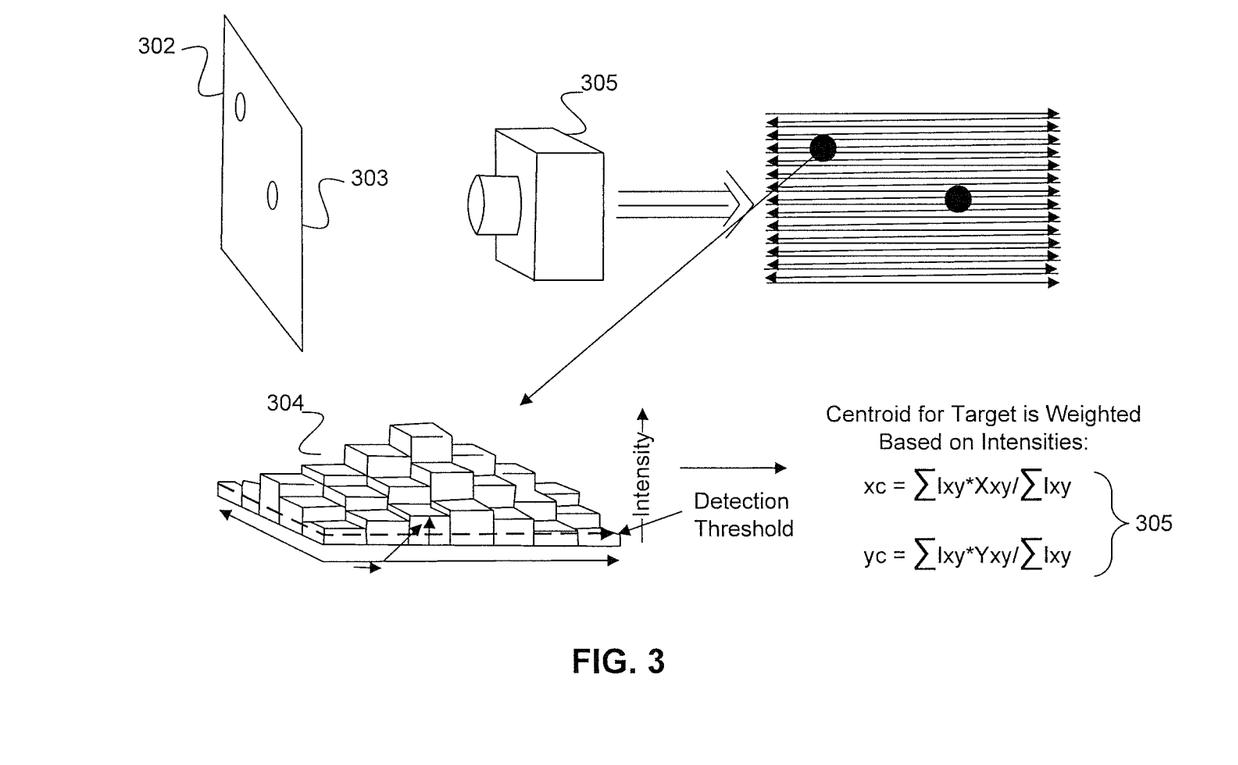
FIG. 3 illustrates a perspective tracking device detecting an emitter and determining the centroid of the emitter, according to an embodiment of the invention.

In FIG. 3 we see an approach for computing the location of an emitter in a PTD field of view. In this view we see a PTD (301) observing two emitters (302, 303). Each emitter light source is perceived by the PTD as a heightened area of sensed light intensity in a bounded area of the digitized field of view. Since the image is sampled using discrete sensor cells, the center of an emitter's image is located by finding the "center" of the light source, or centroid, according to the calculations shown at 305. The pixels of a point light emitter must also be distinguished from its background. To do this, the cells used to compute an emitter's centroid are sorted according to the amplitude detected at each cell (304). They may also sorted on the basis of the location of the pixels, given the size and shape of the grouping of pixels.

Corrections may be applied to the computation of this centroid. The first of these corrections is a temperature-based offset of intensity amplitude on a per cell basis. The second compensation is the exact X:Y location of each cell, based on corrections for errors in the optics inherent in the PTD device. These corrections are applied locally, prior to the centroid computation being made for each emitter's centroid. The final emitter centroid is translated into an offset angle from the center of the PTD field of view.

Figure 4:
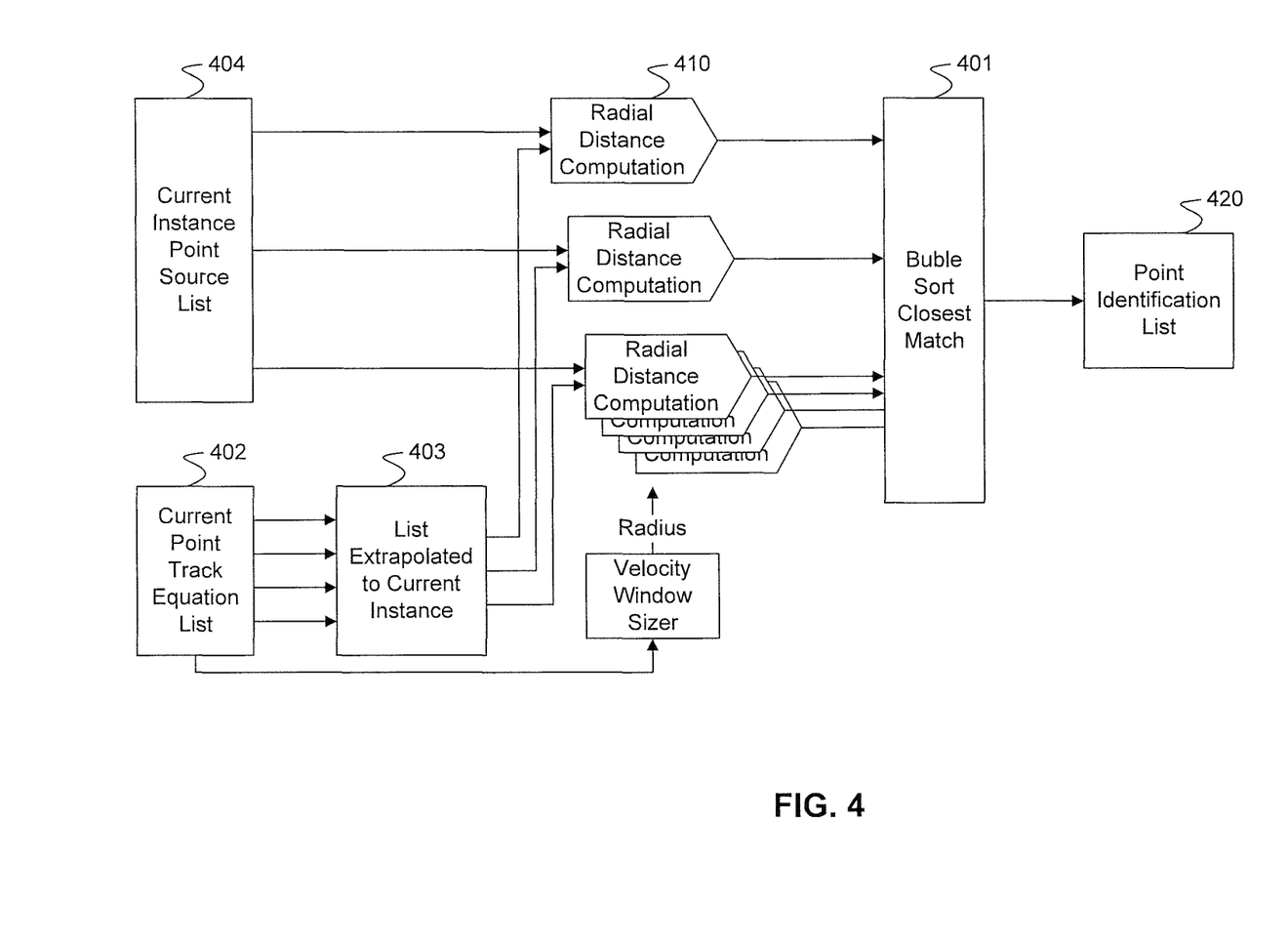
FIG. 4 illustrates the identification of point light emitters using a bubble sort, according to an embodiment of the invention.

In FIG. 4, an emitter centroid is established for more than one frame period. Then a process of identifying the emitters is begun. To this end, a radial bubble sort (401) can be employed to re-identify the emitter on each successive frame. In FIG. 4, the steps in this process are outlined. The invention utilizes a local data analysis capability in reduction of image data to perspective angles and coordinates. This data may be further reduced to precise equations of motion. These motion formulae (402) are communicated to a virtual world generation process, where the formulae are used to compute instantaneous position orientation by extrapolation of the motion formulae (403). The reduction process may be either centralized or distributed.

On each frame, motion equations for each known emitter are advanced to the current time (404). The predicted positions are then compared to detected positions (403) using radial distance computations (410) and sorted using a radial bubble sort (401) to yield a best fit. When a radial distance match occurs within some predefined tolerance, the emitter history and equations are updated for the next frame. The result is a new point identification list (420). If an emitter centroid falls out of the maximum allowed radius then it is assumed to be a new emitter and a new set of equations are started. When an emitter is not detected on a given frame, the equations are coasted and the emitter's entry is marked as modulated. Emitter equations are coasted for a fixed number of frames then deleted as a valid entry.

Figure 5:
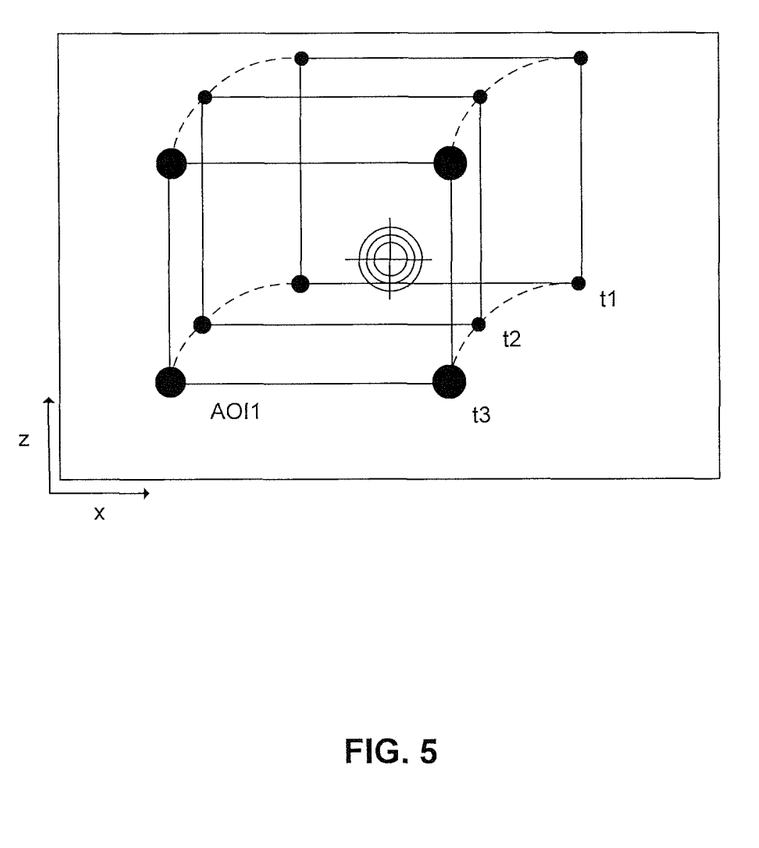
FIG. 5 illustrates the motion of a set of area of interest markers over time, as captured in a sequence of video frames, according to an embodiment of the invention.
Figure 6:
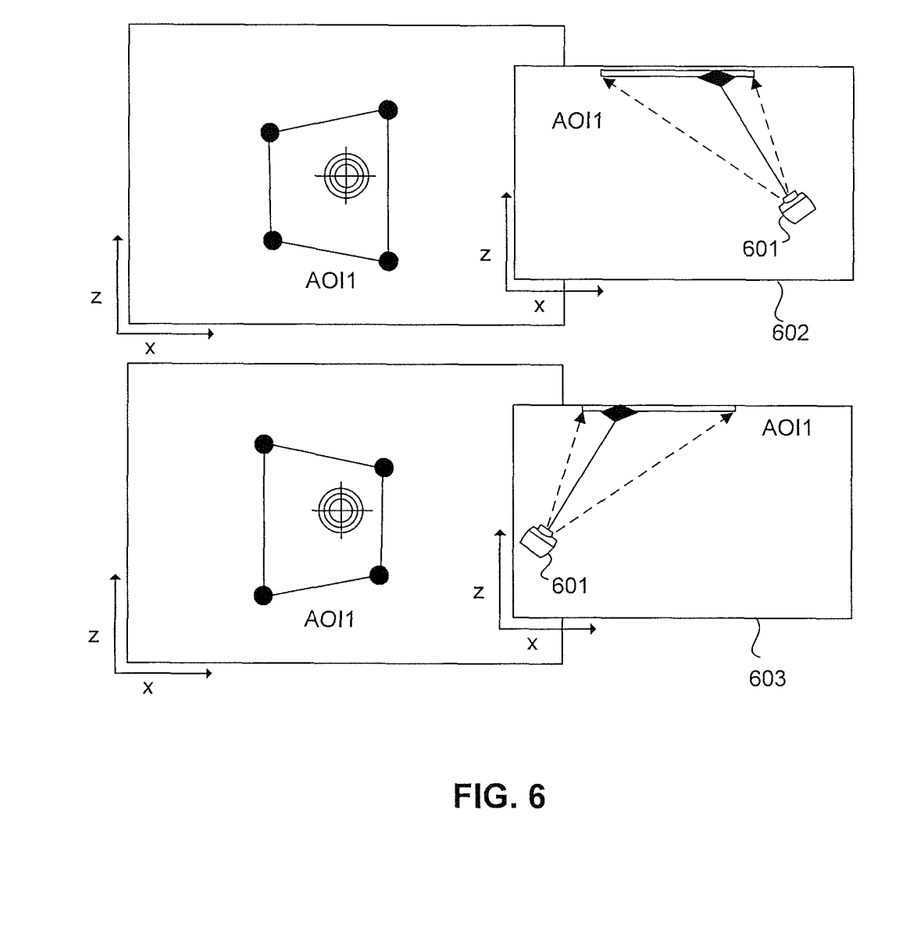
FIG. 6 illustrates changes in the perceived orientation of an area of interest as the viewing angle changes, according to an embodiment of the invention.

Once individual emitters have been identified, the AOI to which they belong may be determined. This may be seen in FIG. 5. The AOI description describes the virtual locations of each emitter in the physical array. Depending on which TPA emitters have been detected, the angular separation of the emitters may then be used to determine the location and perspective of the PTD. This process may be better understood by observing FIGS. 5 and 6. In FIG. 5, we can see that on successive capture frames, at times t1, t2 and t3, the TPA emitters have changed position in the captured field, yet retain their physical location relationships. In FIG. 6 we can see the changes in the geometric relationships of a four point TPA as PTD 601 detects it from the right (602) and left (603) sides. Solution of position and perspective may be derived from the viewed TPA emitter relationships using relatively simple geometric rotations and reduction.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. A perspective tracking system comprising: a computer-based perspective tracking device; and
    an array of emitters configured to define at least one area of interest based on emitted signals from at least two emitters in the array of emitters;
    wherein the computer-based perspective tracking device is configured to determine a spatial position, orientation, and size of the area of interest based on the emitted signals from the array of emitters; and wherein the computer-based perspective tracking system is configured to measure a light intensity of each of the at least two emitters in the array of emitters over a detection threshold and generate a correction equation to the light intensity measurement that yields temperature-based offsets.

2. The system of claim 1 wherein at least one emitter in the array of emitters comprises a light emitter.

3. The system of claim 2 wherein said at least one emitter in the array of emitters is configured to modulate the light to output an identification of said light emitter.

4. The system of claim 3 wherein said identification comprises one or more of:
    an identification sequence;
    an error correction; and a validation sequence.

5. The system of claim 1 wherein said at least one area of interest comprises a n-sided polygon defined by said array of emitters.

6. The system of claim 1 wherein said spatial position, orientation, and size comprise:
    point of gaze; or point of aim.

7. A perspective tracking method comprising:
    capturing, using a computer-based system, an image frame wherein said image frame includes a location of an emitter and a location of a second emitter;
    determining, using the computer-based system, an area of interest based on the location of the first emitter and the location of the second emitter;
    determining, based on the locations of the first and second emitters, a spatial position, an orientation, and a size of the area of interest; wherein the capture of the image frame comprises measuring a light intensity of each of the first and second emitters over a detection threshold and applying a correction equation to the light intensity measurement that yields temperature-based offsets.

8. The method of claim 7, wherein the capture of the image frame further comprises calculating a centroid of the light intensity of each of the first and second emitters.

9. A computer program product comprising a non-transitory computer usable medium having control logic stored therein for causing a computer to track a perspective of an array of emitters, the control logic comprising:
    first computer readable program code for causing the computer to capture an image frame wherein said image frame includes a location of a first emitter and a location of a second emitter;
    second computer readable program code for causing the computer to determine an area of interest based on the location of the first emitter and the location of the second emitter;
    third computer readable program code for causing the computer to determine, based on the locations of the first and second emitters, a spatial position, an orientation, and a size of the area of interest;
    herein the first computer readable program code further comprises:
    computer readable program code for causing the computer to measure a light intensity of each of the first and second emitters over a detection threshold; and
    computer readable program code for causing the computer to generate a correction equation to the light intensity measurement that yields temperature-based offsets.

10. The computer program product of claim 9, wherein the first computer readable program code further comprises:
    computer readable program code for causing the computer to calculate a centroid of the light intensity of each of the first and second emitters.

11. The computer program product of claim 9, wherein said correction equation yields an optical error correction.

* * * * *